(12) United States Patent
Wan et al.

(10) Patent No.: US 8,908,818 B2
(45) Date of Patent: Dec. 9, 2014

(54) CHANNEL ESTIMATION METHOD, APPARATUS AND SYSTEM

(71) Applicant: Huawei Technologies Co., Ltd., Shenzhen, Guangdong (CN)

(72) Inventors: Lei Wan, Shenzhen (CN); Qiang Li, Shenzhen (CN); Mingyu Zhou, Shenzhen (CN); Yuan Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 13/750,167

(22) Filed: Jan. 25, 2013

(65) Prior Publication Data

US 2013/0136199 A1  May 30, 2013

Related U.S. Application Data

(63) Continuation of application No. PCT/CN2011/074114, filed on May 16, 2011.

(30) Foreign Application Priority Data

Jul. 26, 2010  (CN) .......................... 2010 1 0239394

(51) Int. Cl.
*H04L 7/02* (2006.01)
*H04L 25/02* (2006.01)
*H04L 5/00* (2006.01)
*H04B 7/04* (2006.01)

(52) U.S. Cl.
CPC ............ *H04L 25/0226* (2013.01); *H04L 5/005* (2013.01); *H04L 25/0204* (2013.01); *H04L 25/0224* (2013.01); *H04L 5/0007* (2013.01); *H04B 7/0417* (2013.01)
USPC ....................................... 375/360

(58) Field of Classification Search
USPC ......................................................... 375/260
See application file for complete search history.

(56) References Cited

U.S. PATENT DOCUMENTS

| 8,238,496 B1 * | 8/2012 | Narasimhan et al. ......... 375/346 |
| 2009/0181687 A1 * | 7/2009 | Tiirola et al. .................. 455/450 |
| 2011/0002412 A1 | 1/2011 | Hou et al. |

FOREIGN PATENT DOCUMENTS

| CN | 101345974 A | 1/2009 |
| CN | 101686110 A | 3/2010 |

(Continued)

OTHER PUBLICATIONS

Written Opinion of the International Searching Authority in corresponding PCT Patent Application No. PCT/CN2011/074114 (Aug. 25, 2011).

(Continued)

*Primary Examiner* — Tanmay Shah
(74) *Attorney, Agent, or Firm* — Leydig, Voit & Mayer, Ltd.

(57) ABSTRACT

A channel estimation method, comprising when it is determined that in-band SRSs are required to be transmitted, acquiring the number of transmitting antenna ports and the number of layers of the currently transmitted DMRSs; calculating the difference of the number of the transmitting antenna ports and the number of layers of the currently transmitted DMRSs, and using the difference as the number of in-band SRSs that are required to be transmitted; transmitting in-band SRSs to a receiving-end device according to the number of in-band SRSs that are required to be transmitted, to enable the receiving-end device to perform channel estimation according to the currently transmitted DMRSs and the received in-band SRSs.

10 Claims, 3 Drawing Sheets

(56) References Cited

FOREIGN PATENT DOCUMENTS

| | | |
|---|---|---|
| CN | 101764627 A | 6/2010 |
| CN | 101841357 A | 9/2010 |
| EP | 2007021 A1 | 12/2008 |
| WO | WO 2009087182 A2 | 7/2009 |
| WO | WO 2009157734 A2 | 12/2009 |
| WO | WO 2010082756 A2 | 7/2010 |

OTHER PUBLICATIONS

International Search Report in corresponding PCT Patent Application No. PCT/CN2011/074114 (Aug. 25, 2011).

"R1-101746—Further Details on SRS for Release 10," 3GPP TSG-RAN WG1 Meeting #60bis, Apr. 12-16, 2010, Agenda Item 6.5.2, 3GPP, Valbonne, France.

"R1-101911 Channel Sounding Enhancements for LTE-Advanced Uplink," 3GPP TSG-RAN WG1 Meeting #60bis, Apr. 12-16, 2010, Agenda Item 6.5.2, 3GPP, Valbonne, France.

* cited by examiner

CHANNEL ESTIMATION METHOD, APPARATUS AND SYSTEM

CROSS-REFERENCE TO RELATED APPLICATIONS

This application is a continuation of International Patent Application No. PCT/CN2011/074114, filed on May 16, 2011, which claims priority to Chinese Patent Application No. 201010239394.8, filed on Jul. 26, 2010, both of which are hereby incorporated by reference in their entireties.

FIELD OF THE INVENTION

The present invention relates to the field of communication techniques, and more particular, to a method, apparatus and system for channel estimation.

DESCRIPTION OF THE RELATED ART

Demodulation Reference Signal (DMRS) as a type of reference information is a signal that is known on both the receiving-end and the transmitting-end; through DMRS detection and calculation, channel estimation can be performed on a channel to learn about the current status of the channel For example, if a multi-antenna transmission technique is employed in the uplink, in which the number of the transmitting antenna ports is $N_{tx}$, the number of receiving antenna ports is $N_{rx}$, a method of performing channel estimation with DMRSs may be as follows.

First, the number of transmitted layers of DMRSs transmitted on a subframe, $N_{rank}$, is determined, that is, $N_{rank}$ is the number of DMRSs to be transmitted, wherein $N_{rank} \leq N_{tx}$; $N_{rank}$ DMRSs are orthogonalized with different Cyclic Shifts (CS), to get a vector $\vec{s}$ on each subcarrier; $\vec{s}$ is multiplied by a $N_{tx} \times N_{rank}$ dimensional precoding matrix $P_{DMRS}$ to obtain a $N_{tx} \times 1$ dimensional vector $P_{DMRS} \times \vec{s}$; last, each component of $P_{DMRS} \times \vec{s}$ is sent on a transmitting antenna port, in which case a signal $\vec{r}$ received at the receiving-end can be represented as $\vec{r} = HP_{DMRS} \times \vec{s} + \vec{n}$.

Wherein, H is a $N_{tx} \times N_{rx}$ dimensional matrix, representing complete channel information, $\vec{n}$ is a white noise signal, because $\vec{s}$ is known, channel estimation can be performed according to the received signal $\vec{r}$. However, since precoding is applied to DMRSs, and the transmission number $N_{rank}$ is less than or equal to $N_{tx}$, only $HP_{DMRS}$, but not H, can be estimated, that is, complete channel information cannot be obtained; to estimate H, it is necessary to make the number of mutually orthogonal reference signals equal to the number of the transmitting antenna ports $N_{tx}$.

Thus, in the prior art, in addition to transmitting DMRS, Sounding Reference Signals (SRS) with no precoding applied have to be transmitted additionally, wherein the number of SRSs is equal to the number of the transmitting antenna ports $N_{tx}$. Further, in order to increase SRS capacity, in-band SRS is generally employed; in-band SRS as so called refers to SRS transmitted on time-frequency resources allocated for a user, that is, in addition to data and DMRSs, the user further transmits SRSs on time-frequency resources allocated by the system.

Although complete channel information can be estimated with existing solutions, larger overhead arises from the restriction of having to transmit SRSs as the same number as the number of the transmitting antenna ports $N_{tx}$.

SUMMARY OF THE INVENTION

A channel estimation method, apparatus and system are provided in embodiments of this invention for complete channel information estimation with less overhead.

A channel estimation method, comprising:
when it is determined that in-band SRSs are required to be transmitted, acquiring the number of the transmitting antenna ports and the number of layers of currently transmitted DMRSs;
calculating the difference of the number of the transmitting antenna ports and the number of layers of the currently transmitted DMRSs, and using the difference as the number of in-band SRSs that are required to be transmitted;
transmitting in-band SRSs to a receiving-end device according to the number of in-band SRSs that are required to be transmitted, to enable the receiving-end device to perform channel estimation according to the currently transmitted DMRSs and the received in-band SRSs.

A channel estimation method, comprising:
receiving in-band SRSs transmitted from a transmitting-end device, the number of the in-band SRSs being the difference of the number of transmission antenna ports on the transmitting-end device and the number of layers of currently transmitted DMRSs;
performing channel estimation according to the received in-band SRSs and the currently transmitted DMRSs.

A transmitting-end device, comprising:
an acquisition unit for when it is determined that in-band SRSs are required to be transmitted, acquiring the number of the transmitting antenna ports and the number of layers of the currently transmitted DMRSs;
a calculation unit for calculating the difference of the number of the transmitting antenna ports and the number of layers of the currently transmitted DMRSs, and using the difference as the number of in-band SRSs that are required to be transmitted;
a transmission unit for transmitting in-band SRSs to a receiving-end device according to the number of in-band SRSs that are required to be transmitted which is calculated by the calculation unit, to enable the receiving-end device to perform channel estimation according to the currently transmitted DMRSs and the received in-band SRSs.

A receiving-end device, comprising:
a reception unit for receiving in-band SRSs transmitted from a transmitting-end device, the number of the in-band SRSs being the difference of the number of transmission antenna ports on the transmitting-end device and the number of layers of the currently transmitted DMRSs;
an estimation unit for performing channel estimation according to the received in-band SRSs received by the reception unit and the currently transmitted DMRSs.

A communication system, comprising any transmitting-end device provided in the embodiments of this invention and any receiving-end device provided in the embodiments of this invention.

In the embodiments of this invention, the difference of the number of the transmitting antenna ports $N_{tx}$ and the number of layers of the currently transmitted DMRSs $N_{rank}$ is used as the number of in-band SRSs to be transmitted to transmit in-band SRSs to the receiving-end, and then a receiving-end device performs channel estimation using the in-band SRSs in connection with the DMRSs. In the solution of this invention, although only $N_{tx} - N_{rank}$ in-band SRSs are transmitted, because $N_{rank}$ DMRSs are simultaneously transmitted, as for the receiving-end, the number of RSs (DMRS and SRS are both RS) is $N_{tx}-N_{rank}+N_{rank}=N_{tx}$, satisfying the requirement that the number of RSs to be transmitted must be equal to the number of the transmitting antenna ports $N_{tx}$, so that complete channel information can be estimated. Meanwhile, as compared to $N_{tx}$ in-band SRSs being required to be transmitted in the prior art, this solution can reduce overhead due to the reduced number of in-band SRSs transmitted; that is to say, as compared to the prior art, complete channel information can be estimated with less overhead through employing this solution.

BRIEF DESCRIPTION OF THE DRAWINGS

For a more explicit description of the technical solutions of embodiments of this invention, a brief introduction of accompanying drawings to be used in the description of these embodiments will be given below. Obviously, accompanying drawings described below are merely some embodiments of this invention, for those skilled in the art, other accompanying drawings can be derived from these ones without any creative efforts.

DESCRIPTION OF THE EMBODIMENTS

A clear and complete description of technical solutions of embodiments of this invention will be given with reference to the accompanying drawings of the embodiments of this invention. Obviously, embodiments described herein are merely some embodiments of this invention, but not all of them. Based on those embodiments of this invention, other embodiments can occur to those skilled in the art without any creative efforts, all of which fall within the scope of this invention.

A channel estimation method, apparatus and system are provided in embodiments of this invention, as described below in detail respectively.

Embodiment 1

A description will be given in this embodiment from the perspective of a transmitting-end device, which may be a terminal such as a mobile phone, a notebook computer, etc, or other devices that can transmit uplink data.

A channel estimation method, comprising: when it is determined that in-band SRSs are required to be transmitted, acquiring the number of the transmitting antenna ports and the number of layers of currently transmitted DMRSs; calculating the difference of the number of the transmitting antenna ports and the number of layers of the currently transmitted DMRSs, and using the difference as the number of in-band SRSs that are required to be transmitted; transmitting in-band SRSs to a receiving-end device according to the number of in-band SRSs that are required to be transmitted, to enable the receiving-end device to perform channel estimation according to the currently transmitted DMRSs and the received in-band SRSs.

Figure 1:
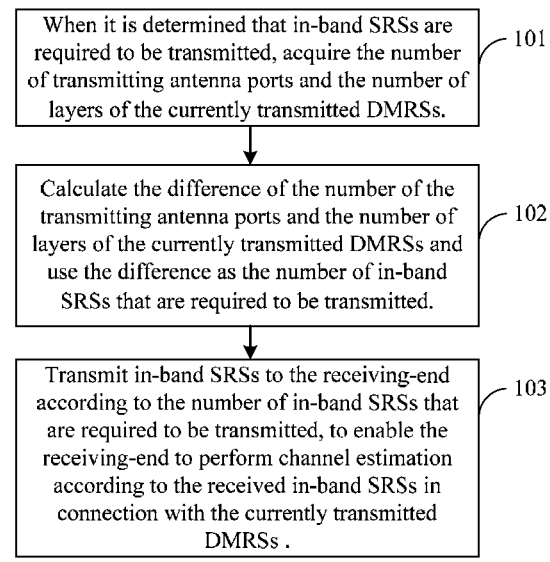
FIG. 1 is a flowchart of a channel estimation method provided in Embodiment 1 of this invention.

As shown in FIG. 1, the particular flow may be as follows.

101. When it is determined that in-band SRSs are required to be transmitted, acquire the number of the transmitting antenna ports and the number of layers of the currently transmitted DMRSs (the number of layers of transmitted DMRSs is just the number of transmitted DMRSs, see Description of the Related Art).

Wherein, any one of the following methods can be used to determine whether it is required to transmit in-band SRSs.

(1) Determine the need for in-band SRS transmission based on a configured parameter.

For example, a parameter can be configured through upper layer signaling in advance, representing that it is required to transmit in-band SRSs when a certain condition is satisfied, such as, transmitting in-band SRSs once every X scheduling of a transmitting-end device (such as a terminal), and the like.

(2) Determine the need for in-band SRS transmission based on physical layer downlink control signaling.

In general, a transmitting-end device receives physical layer downlink control signaling for instructing uplink transmission parameters before it is scheduled. In order to save signaling flow, information instructing whether it is required to transmit in-band SRSs can be carried in the physical layer downlink control signaling, for example, when the instruction information in the received physical layer downlink control signaling indicates that it is required to transmit in-band SRSs, it is determined that it is required to transmit in-band SRSs, and thus step 101 is executed; otherwise, when the instruction information in the received physical layer downlink control signaling indicates that it is not required to transmit in-band SRSs, it is determined that it is not required to transmit in-band SRSs, and thus the flow ends without executing step 101.

Certainly, in addition to carrying instruction information in existing physical layer downlink control signaling, it is also possible to indicate whether it is required to transmit in-band SRSs using newly designed physical layer downlink control signaling.

102. Calculate the difference between the number of the transmitting antenna ports $N_{tx}$ and the number of layers of the currently transmitted DMRSs $N_{rank}$, $N_{tx}-N_{rank}$, and use the difference $N_{tx}-N_{rank}$ as the number of in-band SRSs that are required to be transmitted $N_{SRS}$, that is $N_{SRS}=N_{tx}-N_{rank}$.

103. Transmit in-band SRSs to the receiving-end according to the number of in-band SRSs that are required to be transmitted, $N_{SRS}$, to enable the receiving-end to perform channel estimation according to the received in-band SRSs in connection with the currently transmitted DMRSs, for example, as follows.

S1. Select a precoding matrix $P_{SRS}$ from a predefined codebook according to the number of in-band SRSs that are required to be transmitted.

For example, downlink control signaling carrying a selection rule can be received, after which a DMRS precoding matrix $P_{SRS}$ is selected based on the received selection rule according to number of in-band SRSs required to be transmitted.

Or it is also possible to select the precoding matrix $P_{SRS}$ based on a predetermined selection rule according to the number of in-band SRSs that are required to be transmitted.

Wherein, the selection rule may directly indicate which precoding matrix to be selected, or indicate a mapping rule, for instance, each DMRS precoding matrix may have a matched SRS precoding matrix predetermined, so that when the precoding matrix $P_{DMRS}$ to be used is known, a corresponding SRS precoding matrix $P_{SRS}$ can be selected according to the mapping rule.

S2. Select SRSs according to the number of in-band SRSs that are required to be transmitted, and orthogonalize the selected SRSs.

Wherein, orthogonalization can be performed in many manners, for example, the selected SRSs can be orthogonalized through cyclic shift orthogonalization, existing techniques can be referred to for particular details.

When the selected SRSs are orthogonalized through cyclic shift orthogonalization, cyclic shifts have to be determined first, after which the selected SRSs are orthogonalized according to the determined cyclic shifts. So-called cyclic shift determination means to determine what cyclic shifts will be specifically used. The number of cyclic shifts is equal to the number of the in-band SRSs, that is, the number of cyclic shifts is $N_{SRS}$.

Wherein, cyclic shifts can be determined in many manners. For example, cyclic shifts can be determined through downlink control signaling notification or calculation based on a predetermined rule, or they may be predetermined etc, particularly as follows.

(1) The receiving-end device notifies cyclic shifts through downlink control signaling: that is, the transmitting-end receives downlink control signaling indicating cyclic shifts to be used. For example, which cyclic shifts to be used may be specified in downlink control signaling for scheduling subframes for SRSs.

(2) Calculate cyclic shifts based on a predetermined rule: calculate cyclic shifts that can be used currently based on a predetermined rule, for example, calculate what cyclic shifts will be used for the SRSs according to cyclic shifts provided for the current DMRSs.

(3) Predetermine cyclic shifts: that is, cyclic shifts used for transmitting the $^N$sRs SRSs are configured in advance through upper layer signaling.

S3. The orthogonalized SRSs are precoded using a selected precoding matrix to get precoded SRSs. Existing techniques can be referred to for the particular operations of precoding, which will not be described in detail herein.

S4. The precoded SRSs are transmitted through in-band transmission to the receiving-end device through respective antenna ports.

For example, precoded SRSs can be transmitted on a SC-FDMA symbol, which is used to transmit DMRSs, through respective antenna ports; or precoded SRSs can be transmitted on a SC-FDMA symbol, which is used to transmit data, through respective antenna ports. For example, a SC-FDMA symbol that is originally used for data transmission can be reserved to transmit the precoded SRSs.

Wherein, steps S1 and S2 can be executed in any sequence.

Since DMRS and SRS are both RS, after receiving the SRSs, the receiving-end device can perform channel estimation using the in-band SRSs in connection with DMRSs. Since the number of SRSs $N_{SRS}$ is $N_{tx}-N_{rank}$, and the number of DMRSs is $N_{rank}$, the sum thereof is $N_{tx}-N_{rank}+N_{rank}=N_{tx}$, that is, the total number of RSs is $N_{tx}$, satisfying the condition of "complete channel information estimation": the number of RSs transmitted is equal to the number of the transmitting antenna ports $N_{tx}$. Therefore, in this embodiment, although only $N_{tx}-N_{rank}$ in-band SRSs are transmitted, complete channel information can be still estimated.

It can be seen from above, in this embodiment, the difference of the number of the transmitting antenna ports $N_{tx}$ and the number of layers of the currently transmitted DMRSs $N_{rank}$ is used as the number of in-band SRSs to be transmitted to transmit in-band SRSs to the receiving-end, and then the receiving-end device performs channel estimation using the in-band SRSs in connection with the DMRSs. In the solution of this invention, although only $N_{tx}-N_{rank}$ in-band SRSs are transmitted, $N_{rank}$ DMRSs are transmitted simultaneously, as for the receiving-end device, the number of RSs is equal to the number of the transmitting antenna ports $N_{tx}$. Thus, as compared to $N_{tx}$ in-band SRSs being required to be transmitted in the prior art, the solution provided in this embodiment can realize complete channel information estimation with less overhead (only $N_{tx}-N_{rank}$ in-band SRSs is required to be transmitted).

Embodiment 2

A description will be given in this embodiment from the perspective of a receiving-end device, which may be, for example, a network side device, such as a base station or a server etc, or other devices that can receive uplink data.

A channel estimation method, comprising: receiving in-band SRSs transmitted from the transmitting-end, the number of the in-band SRSs being the difference of the number of transmission antenna ports on the transmitting-end device and the number of layers of the currently transmitted DMRSs; performing channel estimation according to the received in-band SRSs and the currently transmitted DMRSs.

Figure 2:
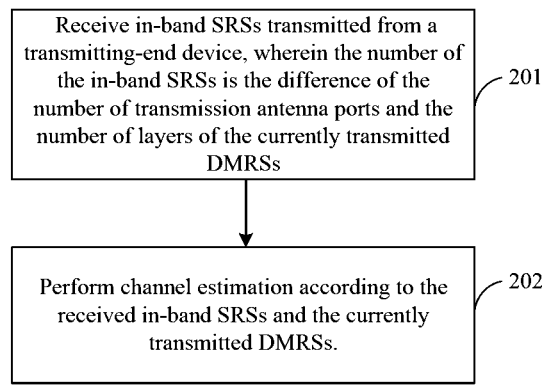
FIG. 2 is a flowchart of a channel estimation method provided in Embodiment 2 of this invention.

Referring to FIG. 2, the particular flow may be as follows.

201. Receive in-band SRSs transmitted from a transmitting-end device, wherein the number of the in-band SRSs $N_{SRS}$, is the difference of the number of transmission antenna ports on the transmitting-end device $N_{tx}$ and the number of layers of the currently transmitted DMRSs $N_{rank}$, that is $N_{SRS}=N_{tx}-N_{rank}$.

202. Perform channel estimation according to the received in-band SRSs and the currently transmitted DMRSs.

Since DMRSs and SRS are both RS, wherein the number of SRSs $N_{SRS}$ is $N_{tx}-N_{rank}$, and the number of DMRSs is $N_{rank}$, the sum thereof is $N_{tx}-N_{rank}+N_{rank}=N_{tx}$, that is, the total number of RSs is $N_{tx}$. Therefore, in this embodiment, although only $N_{tx}-N_{rank}$ in-band SRSs are received, $N_{rank}$ DMRSs are received simultaneously, the condition that the number of received RSs is equal to the number of the transmitting antenna ports $N_{tx}$ can be still satisfied, and thus complete channel information estimation can be realized.

Wherein, there are several channel estimation algorithms, for example, the currently transmitted DMRSs and the received in-band SRSs can be de-orthogonalized respectively to obtain two estimation matrices, which are then used as simultaneous estimation matrices and solved to estimate complete channel matrix information, particularly as follows.

Since $N^{rank}$ DMRSs are transmitted by the transmitting-end device, the receiving-end device can obtain a received signal about the DMRSs $\vec{r}_{DMRS}$ (refer to existing techniques).

$$\vec{r}_{DMRS}=HP_{DMRS}\times\vec{s}_{DMRS}+\vec{n}_1$$

Wherein, $\vec{s}_{DMRS}$ is a DMRS vector obtained on each sub-carrier after the $N_{rank}$ DMRSs are orthogonalized using different cyclic shifts, $P_{DMS}$ is a precoding matrix for the DMRSs, H is a $N_{tx}\times N_{rx}$ dimensional matrix, representing complete channel information, $\vec{n}_1$ is noise.

Since $N_{SRS}=N_{tx}-N_{rank}$ SRSs are transmitted by the transmitting-end device, the receiving-end device can obtain a received signal about the SRSs $\vec{r}_{SRS}$ (refer to existing techniques).

$$\vec{r}_{SRS}=HP_{SRS}\times\vec{s}_{SRS}+\vec{n}_2$$

Wherein, $\vec{s}_{SRS}$ is a SRS vector obtained on each subcarrier after the $N_{SRS}$ SRSs are orthogonalized using different cyclic shifts, $P_{SRS}$ is a precoding matrix for the SRSs, H is a $N_{tx}\times N_{rx}$ dimensional matrix, representing complete channel information, $\vec{n}_2$ is noise.

Because the DMRS vector $\vec{s}_{DMRS}$ and the SRS vector $\vec{s}_{SRS}$ are both orthogonalized with cyclic shifts when the DMRSs and the SRSs are transmitted by the transmitting-end device, after receiving the DMRSs and the SRSs, the receiving-end device needs to de-orthogonalize the received DMRSs and SRSs respectively to obtain:

$$X_{DMRS}=HP_{DMRS}+\vec{n}_1$$

$$X_{SRS}=HP_{SRS}+\vec{n}_2$$

Herein, $X_{DMRS}$ and $X_{SRS}$ are estimated values of $HP_{DMRS}$ and $HP_{SRS}$ respectively. Because the precoding matrix $P_{DMRS}$ of the DMRSs and the precoding matrix $P^{SRS}$ of the SRSs are both known for the receiving-end device, omitting the noises $\vec{n}_1$ and $\vec{n}_2$, the two matrix equations can be expressed as a set of linear equations respectively, as follows.

$X_{DMRS}=HP_{DMRS}$ can be expressed as $N_{rank}\times N_{rx}$ equations, which can be represented as:

$$X_{DMRS,i,j}=\vec{h}_i\times\vec{p}_{DMRS,j} (i=1,2,\ldots,N_{rx},j=1,2,\ldots,N_{rank})$$

$X_{SRS}=HP_{SRS}$ can be expressed as $(N_{tx}-N_{rank})\times N_{rx}$ equations, which can be represented as:

$$X_{SRS,i,j}=\vec{h}_i\times\vec{p}_{SRS,j} (i=1,2,\ldots,N_{rx},j=1,2,\ldots,(N_{tx}-N_{rank}))$$

Herein, $X_{DMRS,i,j}$ represents the value on row i, column j of the matrix $X_{DMRS}$; $X_{SRS,i,j}$ represents the value of row i, column j of the matrix $X_{SRS}$; $\vec{h}_i$ represents the ith row of the matrix H; $\vec{p}_{DMRS,j}$ represents the jth column of the matrix $P_{DMRS}$; $\vec{p}_{SRS,j}$ represents the jth column of the matrix $P_{SRS}$. Because the channel matrix H to be estimated has $N_{rx}\times N_{tx}$ unknown values, and there are $N_{rank}\times N_{rx}+(N_{tx}-N_{rank})\times N_{rx}=N_{rx}\times N_{tx}$ independent equations, all the unknown values can be solved from these simultaneous equations, so that complete channel estimation values can be obtained. The particular solving process will not be described in detail herein.

Note that the above is merely one algorithm of the estimation method, in addition to which, other algorithms can be employed also, which will be not listed herein.

It can be known from above, in this embodiment, the difference of the number of the transmitting antenna ports $N_{tx}$ and the number of layers of the currently transmitted DMRSs $N_{rank}$ is used as the number of in-band SRSs to be transmitted to transmit in-band SRSs to the receiving-end, and then the receiving-end device performs channel estimation using the in-band SRSs in connection with the DMRSs. In the solution of this invention, although only $N_{tx}-N_{rank}$ in-band SRSs are received by the receiving-end device, $N_{rank}$ DMRSs are received simultaneously, as for the receiving-end device, the number of RSs is still equal to the number of the transmitting antenna ports $N_{tx}$. Thus, as compared to $N_{tx}$ in-band SRSs being required to be transmitted in the prior art, the solution provided in this embodiment can realize complete channel information estimation with less overhead.

Embodiment 3

According to the methods described in embodiments 1 and 2, a further illustration will be given below.

In this embodiment, an illustration will be given in which the transmitting-end device is a terminal, and the receiving-end device is a base station (BS).

Figure 3:
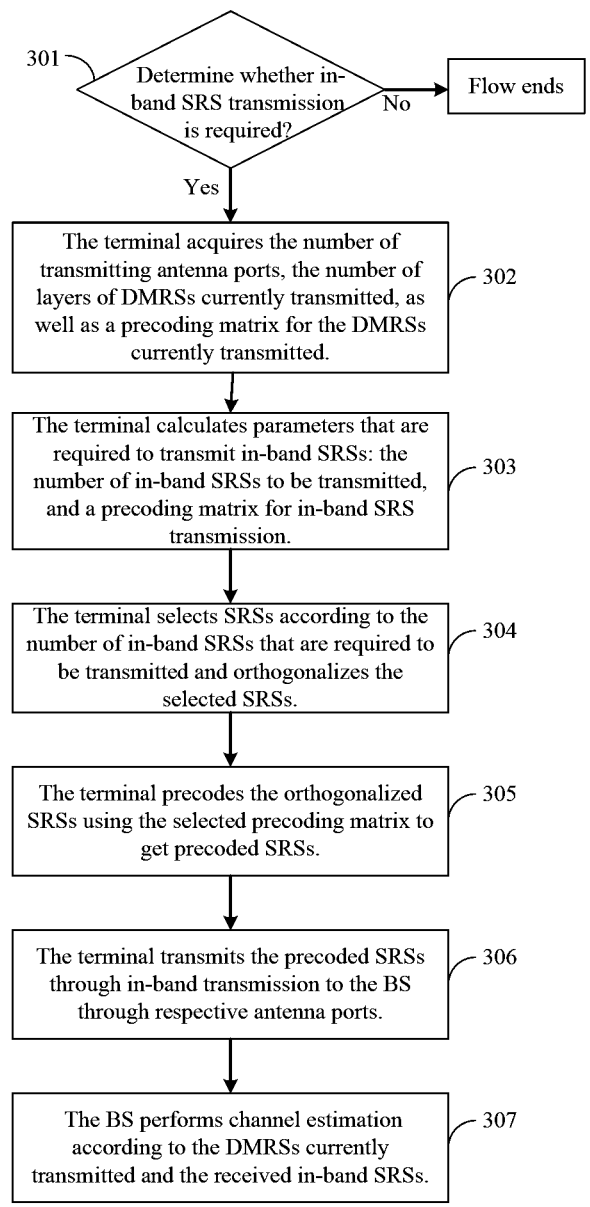
FIG. 3 is a flowchart of a channel estimation method provided in Embodiment 3 of this invention.

Referring to FIG. 3, the particular flow may be as follows.

301. When terminal is scheduled to transmit data, it first determines whether it is required to transmit in-band SRSs in this subframe, if so, step 302 is executed; otherwise, the flow ends.

For example, a parameter can be configured through upper layer signaling in advance, representing that it is required to transmit in-band SRSs when a certain condition is satisfied, such as, transmitting in-band SRSs once every X scheduling of the terminal and the like; or it is also possible to indicate whether in-band SRSs are required to be transmitted through physical layer downlink control signaling transmitted from the BS.

302. The terminal acquires initial information, comprising the number of the transmitting antenna ports $N_{tx}$ of the transmitting-end device and the number of layers of DMRSs currently transmitted $N_{rank}$, as well as a precoding matrix $P_{DMRS}$ for the DMRSs currently transmitted, existing techniques can be referred to for the particular acquisition process, which will not be described in detail herein.

303. The terminal calculates parameters that are required to transmit in-band SRSs, as follows.

(1) The number of in-band SRSs to be transmitted, $N_{SRS}$, that is, how many SRSs to be transmitted;

Because DMRS and SRS are both RS, DMRSs and SRSs can be combined in channel estimation as required RSs. Because $N_{rank}$ DMRSs have been transmitted, only $N_{tx}-N_{rank}$ in-band SRSs are required to be transmitted additionally to satisfying the condition of complete channel information estimation: the number of RSs transmitted is equal to the number of the transmitting antenna ports $N_{tx}$. Therefore, the number of in-band SRSs to be transmitted is $N_{SRS}=N_{tx}-N_{rank}$.

(2) Select a precoding matrix for in-band SRS transmission

According to the number of in-band SRSs that are required to be transmitted $N_{SRS}$, a precoding matrix $P_{SRS}$ is selected from a predefined codebook, for example, from a list of precoding matrices, $P_{SRS}$, which is a $N_{tx}\times N_{SRS}$ matrix.

For example, an indication can be provided in the manner of carrying a selection rule in downlink control signaling transmitted by the BS, or as a predetermine selection rule, and then the precoding matrix $P_{SRS}$ can be selected based on the selection rule according to the number of in-band SRSs.

Wherein, the selection rule may directly indicate which precoding matrix to be selected, or indicate a mapping rule, for instance, each DMRS precoding matrix may have a matched SRS precoding matrix predetermined, so that when the precoding matrix $P_{DMRS}$ to be used is known, a corresponding SRS precoding matrix $P_{SRS}$ can be selected according to the mapping rule.

304. The terminal selects SRSs according to the number of in-band SRSs that are required to be transmitted, that is, the terminal selects $N_{SRS}$ SRSs, and orthogonalizes the selected SRSs. Wherein, orthogonalization can be performed in many manners, for example, the selected SRSs can be orthogonalized by cyclic shift orthogonalization and etc. Existing techniques can be referred to for particular details.

When the selected SRSs are orthogonalized through cyclic shift orthogonalization, $N_{SRS}$ cyclic shifts need to be employed. What cyclic shifts to be specifically used can be determined in the manner of downlink control signaling notification or through calculation based on a predetermined rule, or can be pre-configured by upper layer signaling, for example, a configuration about what cyclic shifts are used to transmit $N_{SRS}$ SRSs, etc.

305. The terminal precodes the orthogonalized SRSs using the selected precoding matrix $P_{SRS}$ to get precoded SRSs. Existing techniques can be referred to for the particular details of precoding, which will not be described herein.

306. The terminal transmits the precoded SRSs to, through in-band transmission, the BS through respective antenna ports. For example, (1) the terminal can transmit the precoded SRSs on a SC-FDMA symbol, which is used to transmit DMRSs, through respective antenna ports; or (2) the terminal can transmit the precoded SRSs on a SC-FDMA symbol, which is used to transmit data, through respective antenna ports. For example, a SC-FDMA symbol that is originally used for data transmission can be reserved to transmit the precoded SRSs.

307. After receiving the in-band SRSs transmitted by the terminal, that is, after receiving the precoded SRSs transmitted at step 306, the BS performs channel estimation using the in-band SRSs in connection with the DMRSs currently transmitted. For example, a reference can be made to the algorithm listed in Embodiment 2.

It can be seen from above, the terminal in this embodiment uses the difference of the number of the transmitting antenna ports $N_{tx}$ and the number of layers of the currently transmitted DMRS $N_{rank}$ as the number of in-band SRSs to be transmitted to transmit in-band SRSs to the BS, and then the BS performs channel estimation using the in-band SRSs in connection with the DMRSs. In the solution of this invention, although only $N_{tx}-N_{rank}$ in-band SRSs are transmitted, $N_{rank}$ DMRSs are transmitted simultaneously, as for the BS, the number of RSs is still equal to the number of the transmitting antenna ports $N_{tx}$. Thus, as compared to $N_{tx}$ in-band SRSs being required to be transmitted in the prior art, the solution provided in this embodiment can realize complete channel information estimation with less overhead.

Embodiment 4

Figure 4A:
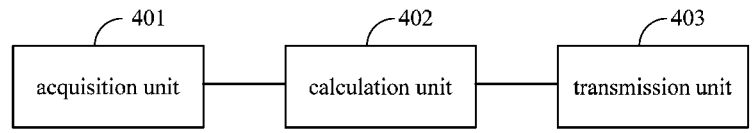
FIG. 4a is a schematic structure diagram of a transmitting-end device provided in an embodiment of this invention.

For the better implementation of the above method, a transmitting-end device is correspondingly provided in this embodiment, referring to FIG. 4a, the transmitting-end device may comprise an acquisition unit 401, a calculation unit 402, and a transmission unit 403.

The acquisition unit 401 is used to when it is determined that in-band SRSs are required to be transmitted, acquire the number of the transmitting antenna ports and the number of layers of the currently transmitted DMRSs.

Wherein, the need for in-band SRS transmission can be determined according to a parameter configured or can be determined according to physical layer downlink control signaling.

The calculation unit 402 is used to calculate the difference of the number of the transmitting antenna ports and the number of layers of the currently transmitted DMRSs acquired by the acquisition unit 401, and use the difference as the number of in-band SRSs that are required to be transmitted; for example, if the number of the transmitting antenna ports is $N_{tx}$, the number of layers of DMRSs currently transmitted is $N_{rank}$, and the number of in-band SRSs that are required to be transmitted is $N_{SRS}$, the number of in-band SRSs that are required to be transmitted $N_{SRS}$ may be expressed as $N_{SRS}=N_{tx}-N_{rank}$.

The transmission unit 403 is used to transmit in-band SRSs to a receiving-end device according to the number of in-band SRSs that are required to be transmitted which is calculated by the calculation unit 402, to enable the receiving-end device to perform channel estimation according to the currently transmitted DMRSs and the received in-band SRSs.

Figure 4B:
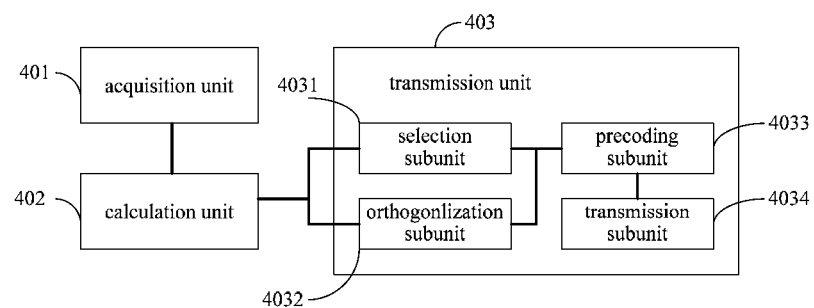
FIG. 4b is another schematic structure diagram of a transmitting-end device provided in an embodiment of this invention.

Wherein, the transmission unit 403 may further comprise a selection subunit 4031, an orthogonlization subunit 4032, a precoding subunit 4033 and a transmission subunit 4034, as shown in FIG. 4b.

The selection subunit 4031 is used to, according to the number of in-band SRSs that are required to be transmitted, which is calculated by the calculation unit 402, select a precoding matrix from a predefined codebook, for example, the selection subunit 4031 is particularly used to receive downlink control signaling carrying a selection rule, and select a precoding matrix $P_{SRS}$ based on the received selection rule from a predetermined codebook according to the number of in-band SRSs; or select a precoding matrix $P_{SRS}$ based on a predetermined selection rule from a predefined codebook according to the number of in-band SRSs.

The orthogonlization subunit 4032 is used to, according to the number of in-band SRSs that are required to be transmitted, which is calculated by the calculation unit 402, select SRSs and orthogonalize the selected SRSs. Wherein, orthogonalization can be performed in many manners, for example, selected SRSs can be orthogonalized through cyclic shift orthogonalization and etc. Existing techniques can be referred to for particular details.

When the selected SRSs are orthogonalized through cyclic shift orthogonalization, $N_{SRS}$ cyclic shifts need to be employed. Which $N_{SRS}$ cyclic shifts to be specifically used can be determined in the manner of downlink control signaling notification or through calculation based on a predetermined rule, or can be pre-configured by upper layer signaling, for example, a configuration about what cyclic shifts are used to transmit $N_{SRS}$ SRSs, etc.

The precoding subunit 4033 is used to perform precoding on the SRSs orthogonalized by the orthogonlization subunit 4032, using the precoding matrix selected by the selection subunit 4031, to obtain precoded SRSs.

The transmission subunit 4034 is used to transmit the SRSs precoded by the precoding subunit 4033 through in-band transmission to the receiving-end device through respective antenna ports. For example, the precoded SRSs can be transmitted to the receiving-end device on a SC-FDMA symbol, which is used to transmit DMRSs, through respective antenna ports; or the precoded SRSs can be transmitted to the receiving-end device on a SC-FDMA symbol, which is used to transmit data, through respective antenna ports, for example, a SC-FDMA symbol that is originally used for data transmission can be reserved to transmit the precoded SRSs.

For the particular implementation of various units above, a reference can be made to the above embodiments, which will not be described in detail herein.

The transmitting-end device may be a terminal, for example, a mobile phone, a notebook computer, etc or other devices that can transmit uplink data.

It can be seen from above, the transmitting-end device in this embodiment may acquire the number of the transmitting antenna ports $N_{tx}$ and the number of layers of the currently transmitted DMRSs $N_{rank}$ with the acquisition unit 401, and then uses the difference of the number of the transmitting antenna ports $N_{tx}$ and the number of layers of the currently transmitted DMRSs $N_{rank}$ as the number of in-band SRSs to be transmitted $N_{SRS}$ with the calculation unit 402, transmits $N_{SRS}$ in-band SRSs to the BS with the transmission unit 403, and then the BS performs channel estimation using the in-band SRSs in connection with the DMRSs. In the solution of this invention, although only $N_{tx}-N_{rank}$ in-band SRSs are transmitted, $N_{rank}$ DMRSs are transmitted simultaneously, as for the BS, the number of RSs is still equal to the number of the transmitting antenna ports $N_{tx}$. Thus, as compared to $N_{tx}$ in-band SRSs that are required to be transmitted in the prior art, the solution provided in this embodiment can realize complete channel information estimation with less overhead.

Embodiment 5

Figure 5:
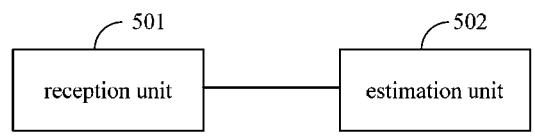
FIG. 5 is a schematic structure diagram of a receiving-end device provided in an embodiment of this invention.

Correspondingly, a receiving-end device is provided in this embodiment, referring to FIG. 5, the receiving-end device comprises a reception unit 501 and an estimation unit 502.

The reception unit 501 is used to receive in-band SRSs transmitted from a transmitting-end device, wherein the number of the in-band SRSs is the difference of the number of transmission antenna ports on the transmitting-end device and the number of layers of the currently transmitted DMRSs; for example, if the number of the transmitting antenna ports is $N_{tx}$, the number of layers of DMRSs currently transmitted is $N_{rank}$, and the number of in-band SRSs that are required to be transmitted is $N_{SRS}$ the number of in-band SRSs that are required to be transmitted $N_{SRS}$ may be expressed as $N_{SRS}=N_{tx}-N_{rank}$.

The estimation unit 502 is used to perform channel estimation according to the received in-band SRSs received by the reception unit 501 and the currently transmitted DMRSs.

Wherein, the estimation unit 502 may comprise a de-orthogonalization subunit and an estimation subunit.

The de-orthogonalization subunit is used to de-orthogonalize the received DMRSs that are currently transmitted and the in-band SRSs received by the reception unit 501 respectively to obtain two estimation matrices.

The estimation subunit is used to estimate complete channel matrix information using the estimation matrices obtained by the de-orthogonalization subunit.

For the particular implementation of various units above, a reference can be made to the above embodiments.

The receiving-end device particularly may be, for example, a network side device, such as a base station or a server etc, or other devices that can receive uplink data.

Since DMRS and SRS are both RS, wherein the number of SRSs $N_{SRS}$ is $N_{tx}-N_{rank}$, and the number of DMRSs is $N_{rank}$, the sum thereof is $N_{tx}-N_{rank}+N_{rank}=N_{tx}$, that is, the total number of RSs is $N_{tx}$. Therefore, in this embodiment, although only $N_{tx}-N_{rank}$ in-band SRSs are transmitted, the condition that the number of transmitted RSs is equal to the number of the transmitting antenna ports $N_{tx}$ can be still satisfied, and thus complete channel information can be estimated.

It can be seen from above, the reception unit 501 of the receiving-end device in this embodiment may receive in-band SRSs, wherein the number of the in-band SRSs is the difference of the number of the transmitting antenna ports $N_{tx}$ and the number of layers of the DMRSs currently transmitted $N_{rank}$, then the estimation unit 502 performs channel estimation with the received in-band SRSs in connection with the DMRSs. In the solution of this invention, although only $N_{tx}-N_{rank}$ in-band SRSs are received, $N_{rank}$ DMRSs are received simultaneously, as for the receiving-end device, the number of RSs is still equal to the number of the transmitting antenna ports $N_{tx}$. Thus, as compared to $N_{tx}$ in-band SRSs being required to be transmitted in the prior art, the solution provided in this embodiment can realize complete channel information estimation with less overhead.

Embodiment 6

A communication system is provided correspondingly in this embodiment, comprising any transmitting-end device provided in the embodiment of this invention, and any receiving-end device provided in the embodiment of this invention.

Figure 6:
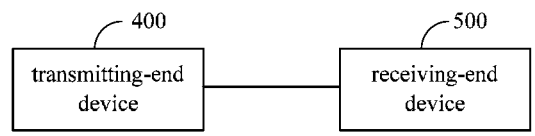
FIG. 6 is a schematic structure diagram of a communication system provided in an embodiment of this invention.

For example, as shown in FIG. 6, the communication system comprises a transmitting-end device 400 and a receiving-end device 500.

Wherein, the transmitting-end device 400 is used to when it is determined that in-band SRSs need to be transmitted, acquire the number of the transmitting antenna ports $N_{tx}$ and the number of layers of the currently transmitted DMRSs $N_{rank}$, calculate the difference of the acquired transmitting antenna port number $N_{tx}$ and the number of layers of the currently transmitted DMRSs $N_{rank}$, use the difference as the number of in-band SRSs that are required to be transmitted $N_{SRS}$, that is, $N_{SRS}=N_{tx}-N_{rank}$, and then transmit in-band SRSs to the receiving-end device 500 according to the in-band SRS number $N_{SRS}$; wherein, transmitting in-band SRSs to the receiving-end device 500 according to the in-band SRS number $N_{SRS}$ may particularly comprise:

(1) according to the in-band SRS number $N_{SRS}$, selecting a precoding matrix $P_{SRS}$ from a list of precoding matrices, $P_{SRS}$, which is a $N_{tx} \times N_{tx}$ matrix;

(2) selecting $N_{SRS}$ SRSs and orthognalizing the selected SRSs;

(3) performing precoding on the orthogonalized SRSs using the selected $P_{SRS}$ to obtain precoded SRSs;

(4) transmitting the precoded SRSs through in-band transmission to the BS through respective antenna ports; in the transmission, the SRSs can be transmitted on a SC-FDMA symbol, which is used to transmit DMRSs, or on a reserved SC-FDMA symbol.

The receiving-end device 500 is used to receive the in-band SRSs transmitted from the transmitting-end device 400, and perform channel estimation according to the DMRSs currently transmitted and the received in-band SRSs.

A reference can be made to the above embodiments for the particular implementation of the various units above, which will not be described in detail herein.

It can be known from above, the transmitting-end device 400 of the communication system provided in this embodiment uses the difference of the number of the transmitting antenna ports $N_{tx}$ and the number of layers of the currently transmitted DMRSs $N_{rank}$ as the number of in-band SRSs to be transmitted to transmit in-band SRSs to the receiving-end device 500, and then the receiving-end device 500 performs channel estimation using the in-band SRSs in connection with the DMRSs. In the solution of this invention, although only $N_{tx}-N_{rank}$ in-band SRSs are received by the receiving-end device 500, $N_{rank}$ DMRSs are received simultaneously, as for the receiving-end device 500, the number of RSs is still equal to the number of the transmitting antenna ports $N_{tx}$. Thus, as compared to $N_{tx}$ in-band SRSs being required to be transmitted in the prior art, the solution provided in this embodiment can realize complete channel information estimation with less overhead.

Those skilled in the art may appreciate that all or some of steps in the various methods of the above embodiments can be realized by programs and instruction related hardware, the programs can be stored in a computer readable storage medium, which may comprise Read Only Memory (ROM), Random Access Memory (RAM), magnetic disc or optical disc, etc.

The method, device and system for channel estimation provided in embodiments of this invention have been described in detail above. In this description, the principle and implementation of this invention have been set forth with specific examples, and the description of the embodiments above is merely used to help the understanding of the methods of this invention and its core idea; meanwhile, modifications in particular implementation or application scope can be made by those skilled in the art according to the idea of this invention. In sum, the content of this specification should not be constructed as limitations of this invention.

What is claimed is:

1. A channel estimation method, comprising:

when it is determined that in-band Sounding Reference Signals (SRSs) are required to be transmitted, acquiring a quantity of transmitting antenna ports ($N_{tx}$) and a quantity of layers of currently transmitted Demodulation Reference Signals (DMRSs) ($N_{rank}$);

calculating a difference of $N_{tx}$ and $N_{rank}$ and using the difference as a quantity of the in-band SRSs that are required to be transmitted;

transmitting the in-band SRSs to a receiving-end device according to the quantity of the in-band SRSs that are required to be transmitted to enable the receiving-end device to perform channel estimation according to the currently transmitted DMRSs and the transmitted in-band SRSs.

2. The method according to claim 1, wherein transmitting the in-band SRSs to the receiving-end device according to the quantity of the in-band SRSs comprises:

selecting a precoding matrix from a predetermined codebook according to the quantity of the in-band SRSs that are required to be transmitted;

selecting SRSs according to the quantity of the in-band SRSs and orthognalizing the selected SRSs;

performing precoding on the orthogonalized SRSs using the selected precoding matrix to obtain precoded SRSs;

transmitting the precoded SRSs through in-band transmission to the receiving-end device through one or more of the transmitting antenna ports.

3. The method according to claim 2, wherein selecting the precoding matrix according to the quantity of the in-band SRSs comprises at least one of the group consisting of:

(a) receiving downlink control signaling carrying a selection rule and selecting the precoding matrix from the predetermined codebook based on the selection rule according to the quantity of the in-band SRSs; and (b) selecting the precoding matrix from the predetermined codebook based on a predetermined selection rule according to the quantity of the in-band SRSs.

4. The method according to claim 2, wherein orthognalizing the selected SRSs comprises:

orthognalizing the selected SRSs through cyclic shift orthogonalization.

5. The method according to claim 4, wherein orthognalizing the selected SRSs through the cyclic shift orthogonalization comprises at least one step of the group consisting of:

determining cyclic shifts through at least one of the group consisting of (a) receiving downlink control signaling indicating the cyclic shifts, (b) calculating the cyclic shifts according to a specified rule, and (c) specifying the cyclic shifts in advance; and orthognalizing the selected SRSs according to the determined cyclic shifts.

6. The method according to claim 2, wherein transmitting the precoded SRSs through the in-band transmission to the receiving-end device through the respective antenna ports comprises at least one step of the group consisting of:

(a) transmitting the precoded SRSs on a Single-carrier Frequency-Division Multiple Access (SC-FDMA) symbol, which is used to transmit the DMRSs, through the respective antenna ports; and (b) transmitting the precoded SRSs on a SC-FDMA symbol, which is used to transmit data, through the respective antenna ports.

7. The method according to claim 1, wherein determining that the in-band SRSs are required to be transmitted comprises at least one of the group consisting of:

(a) determining whether to transmit the in-band SRSs according to a configured parameter; and (b) determining whether to transmit the in-band SRSs according to information carried in physical layer downlink control signaling.

8. A transmitting-end device, comprising:

an acquisition unit, configured to acquire a quantity of transmitting antenna ports ($N_{tx}$) and a quantity of layers of currently transmitted Demodulation Reference Signals (DMRSs) ($N_{rank}$) when it is determined that in-band Sounding Reference Signals (SRSs) are required to be transmitted;

a calculation unit, configured to calculate a difference of ($N_{tx}$) ($N_{rank}$), and using the difference as the quantity of the in-band SRSs;

a transmission unit, configured to transmit the in-band SRSs to a receiving-end device according to the quantity of the in-band SRSs which is calculated by the calculation unit, to enable the receiving-end device to perform channel estimation according to the currently transmitted DMRSs and the received in-band SRSs.

9. The transmitting-end device according to claim 8, wherein the transmission unit comprises:

a selection subunit configured to select a precoding matrix from a predefined codebook according to the quantity of the in-band SRSs;

an orthogonlization subunit configured to select SRSs according to the quantity of in-band SRSs and to orthogonalize the selected SRSs;

a precoding subunit configured to perform precoding on the orthogonalized SRSs using the precoding matrix selected by the selection subunit to obtain precoded SRSs; and a transmission subunit configured to transmit the SRSs precoded by the precoding subunit through in-band transmission to the receiving-end device through one or more of the transmitting antenna ports.

10. The transmitting-end device according to claim 9, wherein the selection subunit is configured to receive downlink control signaling carrying a selection rule and to select the precoding matrix from a predetermined codebook based on the selection rule according to the quantity of the in-band SRSs that are required to be transmitted.

* * * * *

UNITED STATES PATENT AND TRADEMARK OFFICE
CERTIFICATE OF CORRECTION

| | | |
|---|---|---|
| PATENT NO. | : 8,908,818 B2 | Page 1 of 1 |
| APPLICATION NO. | : 13/750167 | |
| DATED | : December 9, 2014 | |
| INVENTOR(S) | : Wan et al. | |

It is certified that error appears in the above-identified patent and that said Letters Patent is hereby corrected as shown below:

In the Claims

Column 13
Line 39, Claim 2, "orthognalizing" should read --orthogonalizing--.

Line 55-56, Claim 4, "orthognalizing" should read --orthogonalizing--.

Line 59-60, Claim 5, "orthognalizing" should read --orthogonalizing--.

Column 14
Line 4, Claim 5, "orthognalizing" should read --orthogonalizing--.

Signed and Sealed this
Sixteenth Day of June, 2015

Michelle K. Lee
*Director of the United States Patent and Trademark Office*